United States Patent
Streett et al.

(10) Patent No.: US 11,995,443 B2
(45) Date of Patent: May 28, 2024

(54) REUSE OF BRANCH INFORMATION QUEUE ENTRIES FOR MULTIPLE INSTANCES OF PREDICTED CONTROL INSTRUCTIONS IN CAPTURED LOOPS IN A PROCESSOR

(71) Applicant: Microsoft Technology Licensing, LLC, Redmond, WA (US)

(72) Inventors: Daren Eugene Streett, Cary, NC (US); Rami Mohammad Al Sheikh, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 17/959,829

(22) Filed: Oct. 4, 2022

(65) Prior Publication Data

US 2024/0111540 A1   Apr. 4, 2024

(51) Int. Cl.
*G06F 9/38*   (2018.01)
*G06F 9/30*   (2018.01)

(52) U.S. Cl.
CPC ........ *G06F 9/3806* (2013.01); *G06F 9/30065* (2013.01); *G06F 9/3844* (2013.01); *G06F 9/3856* (2023.08); *G06F 9/3867* (2013.01)

(58) Field of Classification Search
CPC .. G06F 9/3806; G06F 9/30065; G06F 9/3844; G06F 9/3856; G06F 9/3867
See application file for complete search history.

(56) References Cited

U.S. PATENT DOCUMENTS

| 4,679,141 | A  | * | 7/1987  | Pomerene   | G06F 9/3844 |
|           |    |   |         |            | 712/240     |
| 6,598,152 | B1 |   | 7/2003  | Sinharoy   |             |
| 6,799,268 | B1 |   | 9/2004  | Boggs      |             |
| 7,130,991 | B1 | * | 10/2006 | Butler     | G06F 9/3844 |
|           |    |   |         |            | 712/233     |
| 10,838,729 | B1 | * | 11/2020 | Al-Otoom  | G06F 9/3838 |
| 10,990,404 | B2 | * | 4/2021  | Bouzguarrou | G06F 9/3844 |

(Continued)

OTHER PUBLICATIONS

International Search Report and Written Opinion received for PCT Application No. PCT/US2023/031322, Dec. 12, 2023, 10 pages.

*Primary Examiner* — Shawn Doman
(74) *Attorney, Agent, or Firm* — Withrow & Terranova, PLLC

(57) ABSTRACT

Reuse of branch information queue entries for multiple instances of predicted control instructions in captured loops in a processor, and related methods and computer-readable media. The processor establishes and updates a branch entry in a branch information queue (BIQ) circuit with branch information in response to a speculative prediction made for a predicted control instruction. The branch information is used for making and tracking flow path predictions for predicted control instructions as well as verifying such predictions against its resolution for possible misprediction recovery. The processor is configured to reuse the same branch entry in the BIQ circuit for each instance of the predicted control instruction. This conserves space in the BIQ circuit, which allows for a smaller sized BIQ circuit to be used thus conserving area and power consumption. The branch information for each instance of a predicted control instruction within a loop remains consistent.

21 Claims, 6 Drawing Sheets

(56) References Cited

U.S. PATENT DOCUMENTS

| | | |
|---|---|---|
| 2004/0143709 A1* | 7/2004 | McDonald ............ G06F 9/3806 |
| | | 711/144 |
| 2005/0204120 A1* | 9/2005 | Prasky ................... G06F 9/325 |
| | | 712/238 |
| 2007/0113059 A1* | 5/2007 | Tran ........................ G06F 9/381 |
| | | 712/E9.058 |
| 2007/0288736 A1 | 12/2007 | Luick |
| 2008/0005542 A1 | 1/2008 | Gschwind |
| 2009/0094444 A1 | 4/2009 | Dieffenderfer |
| 2016/0132331 A1 | 5/2016 | Godard et al. |
| 2017/0249149 A1* | 8/2017 | Priyadarshi ......... G06F 9/30021 |
| 2018/0095753 A1* | 4/2018 | Bai ......................... G06F 9/324 |
| 2018/0173534 A1 | 6/2018 | Peled et al. |
| 2018/0232232 A1 | 8/2018 | Jung |
| 2020/0050458 A1 | 2/2020 | Bouzguarrou et al. |
| 2021/0019150 A1* | 1/2021 | Schinzler ............ G06F 9/30058 |
| 2021/0382718 A1 | 12/2021 | Agrawal et al. |
| 2022/0283811 A1 | 9/2022 | Al Sheikh |
| 2022/0308878 A1* | 9/2022 | Ableidinger .......... G06F 9/3808 |

* cited by examiner

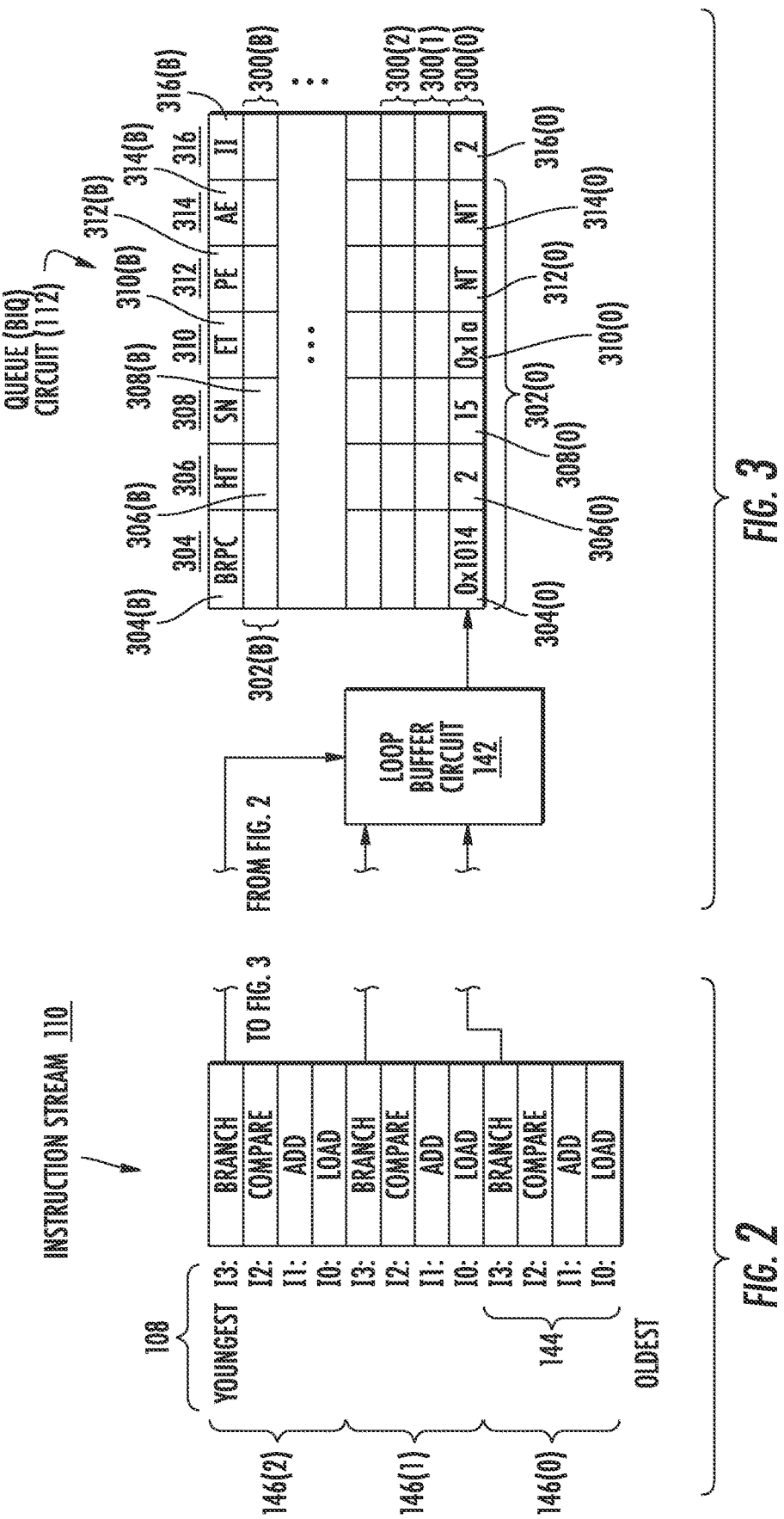

REUSE OF BRANCH INFORMATION QUEUE ENTRIES FOR MULTIPLE INSTANCES OF PREDICTED CONTROL INSTRUCTIONS IN CAPTURED LOOPS IN A PROCESSOR

FIELD OF THE DISCLOSURE

The technology of the disclosure relates generally to speculative prediction of control flow computer instructions ("instructions") in an instruction pipeline of a processor, and more particularly to misprediction recovery after a speculative prediction of a control flow instruction is resolved at execution as a misprediction.

BACKGROUND

Instruction pipelining is a processing technique whereby the throughput of computer instructions being executed by a processor may be increased by splitting the handling of each instruction into a series of steps. These steps are executed in an execution pipeline composed of multiple stages. Optimal processor performance may be achieved if all stages in an execution pipeline are able to process instructions concurrently and sequentially as the instructions are ordered in the instruction pipeline(s). However, structural hazards can occur in an instruction pipeline where the next instruction cannot be executed without leading to incorrect computation results. For example, a control hazard may occur as a result of execution of a predicted control instruction. One example of a predicted control instruction that can cause a control hazard is a conditional branch instruction. A predicted control instruction, such as a conditional branch instruction, may redirect the flow path of instruction execution based on conditions evaluated when the condition of the control branch instruction is executed. Another example of a predicted control instruction that can cause a structural hazard is an indirect branch instruction that has an indirect branch target (address) stored at a memory location that must be loaded. The processor may have to stall the fetching of additional instructions until the predicted control instruction has executed, resulting in reduced processor performance and increased power consumption.

One approach for maximizing processor performance to reduce stalls as a result of processing predicted control instructions involves utilizing a prediction circuit. A prediction circuit can be utilized in a processor to speculatively predict the result of predicted control instruction (e.g., a branch condition or branch target address) that will control the instruction execution flow path. For example, the prediction of whether a conditional branch instruction will be taken can be based on a branch prediction history of previous conditional branch instructions. When the control flow instruction finally reaches the execution stage of the instruction pipeline and is executed, the resultant target address of the control flow instruction is verified by comparing it with the previously predicted target address when the control flow instruction was fetched. If the predicted and actual target addresses match, meaning a correct prediction was made, delay is not incurred in instruction execution because the subsequent instructions at the target address will have been correctly fetched and already be present in the instruction pipeline when the conditional branch instruction reaches an execution stage of the instruction pipeline. However, if the predicted and actual target addresses do not match, a misprediction recovery is performed that can involve flushing of younger instructions and refetching of instructions in a correctly resolved instruction flow path. In either case, the branch prediction history can be "trained" such that resolved results of a predicted control instruction determined at execution time can be tracked and maintained to contribute to future predictions of such predicted control instruction. As a result of a predicted control instruction misprediction, the instruction pipeline can be flushed and the instruction pipeline fetch unit redirected to fetch new instructions starting from the target address. However, the misprediction results in delay known as the "misprediction penalty," which reduces instruction pipeline throughput performance. Also, stages in the execution pipeline may remain dormant until the newly fetched instructions make their way through the instruction pipeline to the execution stage, thereby reducing performance. Misprediction in the processing of instructions in a processor is costly in terms of the resulting delay and reduced performance.

In conventional processors, when a prediction is made for a predicted control instruction, the processor is also configured to update a branch information queue associated with the predicted control instruction. The branch information queue is also known as a branch reorder buffer. A branch entry in the branch information queue is allocated for the predicted control instruction, and a branch prediction is updated in the branch entry in the branch information queue associated with the predicted control instruction. When the predicted control instruction is resolved in execution, the resolved branch outcome is also updated in the branch entry in the branch information queue associated with the predicted control instruction. The information stored in the branch information queue for a predicted control instruction is used for performing branch prediction training. The information stored in the branch information queue for a predicted control instruction can be used to reverse the effect of a mispredicted predicted control instruction on branch prediction history so that a mispredicted predicted control instruction does not negatively affect future predictions of the predicted control instruction. In this regard, the branch prediction history is updated in response to a flush event generated in response to a mispredicted predicted control instruction so that future predictions are based on the actual resolved conditions of the predicted control instruction to improve prediction accuracy. Further, if the predicted control instruction is part of a loop wherein multiple instances of the predicted control instruction are encountered for multiple iterations of the loop, a branch entry is created in the branch information queue for each iteration of the branch instruction. This is so that the branch instruction prediction and its resolution is tracked for each iteration of branch instruction in each iteration of the loop.

Exemplary aspects disclosed herein include reuse of branch information queue entries for multiple instances of predicted control instructions in captured loops in a processor. Related methods and computer-readable media are also disclosed. The processor includes an instruction processing circuit configured to fetch computer program instructions ("instructions") into an instruction stream in an instruction pipeline(s) to be processed and executed. The processor is configured to speculatively predict a condition or target of a fetched predicted control instruction (e.g., branch instruction) (referred to as speculatively predicting the predicted control instruction) to fetch younger instructions in the predicted instruction flow path for processing. In response to a speculative prediction, the processor is configured to establish and update a branch entry in a branch information queue (BIQ) circuit with branch information associated with predicted control instruction. For example, the branch information can be used in combination with a branch prediction history for making and tracking flow path predictions for predicted control instructions as well as verifying such predictions against the resolved condition or target when executed. Misprediction recovery efforts can be taken in response to a detected misprediction, such as flushing and re-fetching of instructions in the correct instruction flow path. The branch information stored in the BIQ circuit can also be used to reverse the effect of a mispredicted predicted control instruction on the branch prediction history as part a misprediction recovery, so that the misprediction does not negatively affect future predictions of the predicted control instruction. In exemplary aspects, to avoid the need to establish a separate branch entry in the BIQ circuit for each instance of a predicted control instruction within a loop for each iteration of the loop, the processor is configured to reuse the same branch entry in the BIQ circuit for each instance of the predicted control instruction. This is available because the branch information for each instance of a predicted control instruction within a loop remains consistent for each iteration of the loop. This conserves space in the BIQ circuit, which allows for a smaller sized BIQ circuit to be used thus conserving area and power consumption.

In exemplary aspects, for the processor to be aware of the number of instances of a predicted control instruction within a loop in which its branch information needs to be preserved, the entries in the BIQ circuit also include an instance indicator. The instance indicator is updated for each instance of the predicted control instruction in the branch entry in the BIQ circuit associated with the predicted control instruction, to track the number of instances of the predicted control instruction within a loop. The instance indicator may be a counter for example, wherein the counter is incremented for each new instance predicted, and decremented for each instance that is resolved at execution. In response to execution of an instance of the predicted control instruction within a loop, the instance indicator and its associated branch entry in the BIQ circuit is accessed to be able to verify the resolution of its earlier prediction. When the instance indicator indicates that the resolution of each instance of the predicted control instruction within its loop has been verified (e.g., by the instance indicator indicating zero (0) unresolved instances remaining), the branch entry in the BIQ circuit can be de-allocated and re-established for a new predicted control instruction encountered in the instruction stream.

In this regard, in one exemplary aspect, a processor is provided. The processor comprises an instruction processing circuit, and a branch information queue (BIQ) circuit comprising a plurality of branch entries each configured to store branch information associated with a predicted control instruction, and an instance indicator. The instruction processing circuit is configured to fetch a plurality of instructions as an instruction stream into an instruction pipeline. The instruction processing circuit is further configured to store first branch information associated with a first instance of a first predicted control instruction of the plurality of instructions in a first branch entry associated with the first predicted control instruction among the plurality of branch entries in the BIQ circuit. The instruction processing circuit is further configured to speculatively predict the first instance of the first predicted control instruction based on the first branch information stored in the first branch entry. The instruction processing circuit is further configured to detect a first iteration of a first loop comprising a second instance of the first predicted control instruction in the instruction stream. In response to detection of the first iteration of the first loop in the instruction stream, the instruction processing circuit is further configured to update a first instance indicator in the first branch entry indicating the second instance of the first predicted control instruction.

In another exemplary aspect, a method of reusing branch information for multiple instances of predicted control instructions in a captured loops in a processor is provided. The method comprises fetching a plurality of instructions as an instruction stream into an instruction pipeline. The method also comprises storing first branch information associated with a first instance of a first predicted control instruction of the plurality of instructions in a first branch entry of a plurality of branch entries in a branch information queue (BIQ) circuit, the first branch entry associated with the first predicted control instruction. The method also comprises speculatively predicting a first condition of the first instance of the first predicted control instruction based on the first branch information stored in the first branch entry. The method also comprises detecting a first iteration of a first loop comprising a second instance of the first predicted control instruction in the instruction stream. The method also comprises updating a first instance indicator in the first branch entry indicating the second instance of the first predicted control instruction, in response to detection of the first iteration of the first loop in the instruction stream.

In another exemplary aspect, a non-transitory computer-readable medium having stored thereon computer executable instructions is provided. The transitory computer-readable medium which, when executed by a processor, causes the processor to fetch a plurality of instructions as an instruction stream into an instruction pipeline; store first branch information associated with a first instance of a first predicted control instruction of the plurality of instructions in a first branch entry of a plurality of branch entries in a branch information queue (BIQ) circuit, the first branch entry associated with the first predicted control instruction; speculatively predict the first instance of the first predicted control instruction based on the first branch information stored in the first branch entry; detect a first iteration of a first loop comprising a second instance of the first predicted control instruction in the instruction stream; and update a first instance indicator in the first branch entry indicating the second instance of the first predicted control instruction, in response to detection of the first iteration of the first loop in the instruction stream.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a diagram of an exemplary processor that includes an exemplary instruction processing circuit that includes a speculative prediction circuit configured to make speculative predictions for fetched predicted control instructions based on a speculative prediction history and update branch information in a branch information queue (BIQ) circuit used for making, tracking, and resolving such predictions, wherein the processor is also configured to reuse entries in the BIQ circuit for multiple instances of predicted control instructions in captured loops in a processor;

FIG. 2 is an exemplary instruction stream that contains a loop of instructions fetched and processed in multiple iterations in the instruction processing circuit in FIG. 1;

FIG. 3 is an exemplary BIQ circuit that can be included in the processor in FIG. 1 and that is configured to store branch information for the fetched and speculatively predicted control instruction in the loop in FIG. 2, wherein each of the branch entries in the BIQ circuit include an instance indicator field configured to store an instance indicator indicating the number of instances that a predicted control instruction in a loop has been fetched and speculatively predicted so that such entries can be reused for multiple instances of the predicted control instructions within a loop;

Figure 1:
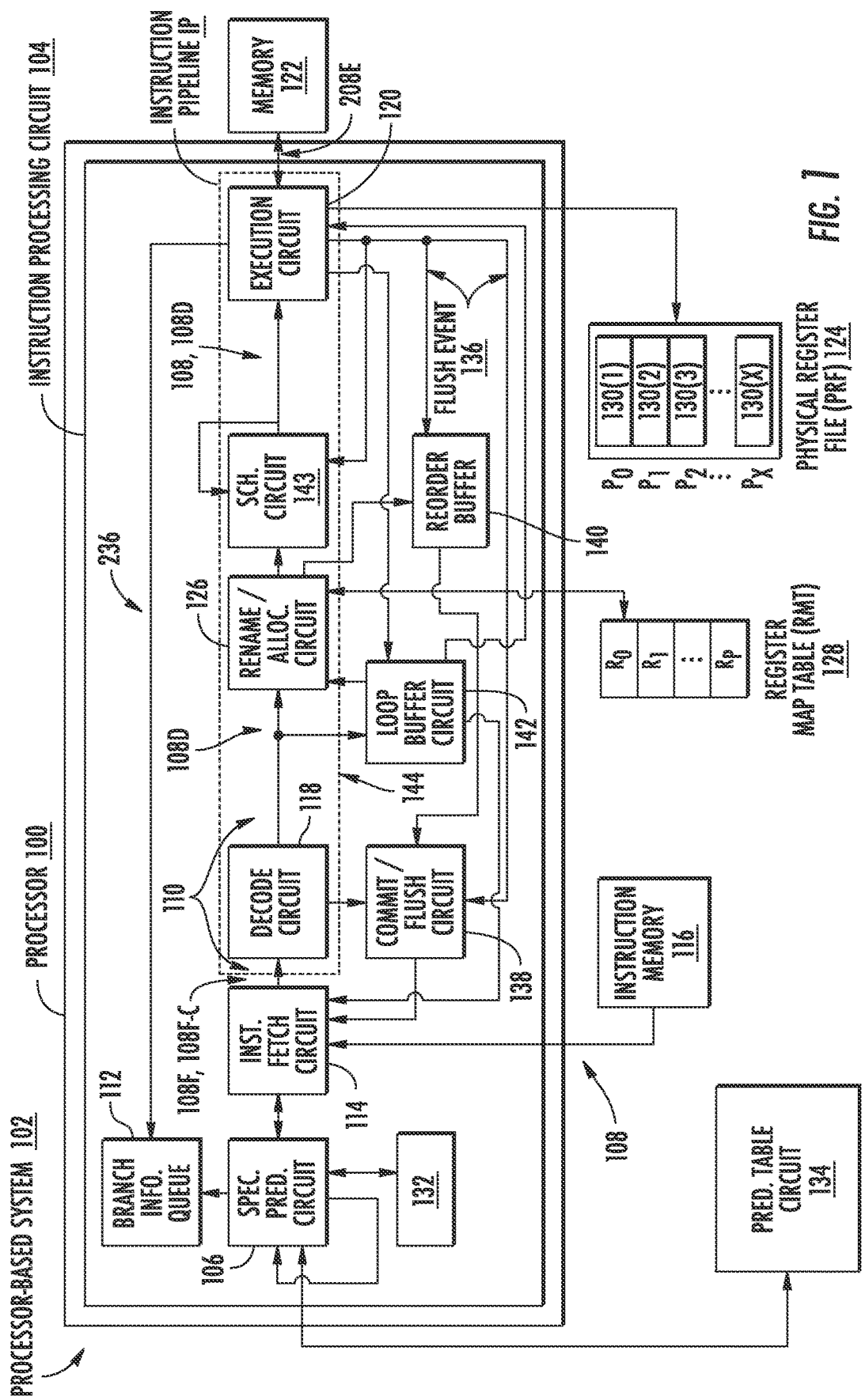
Figure 6:
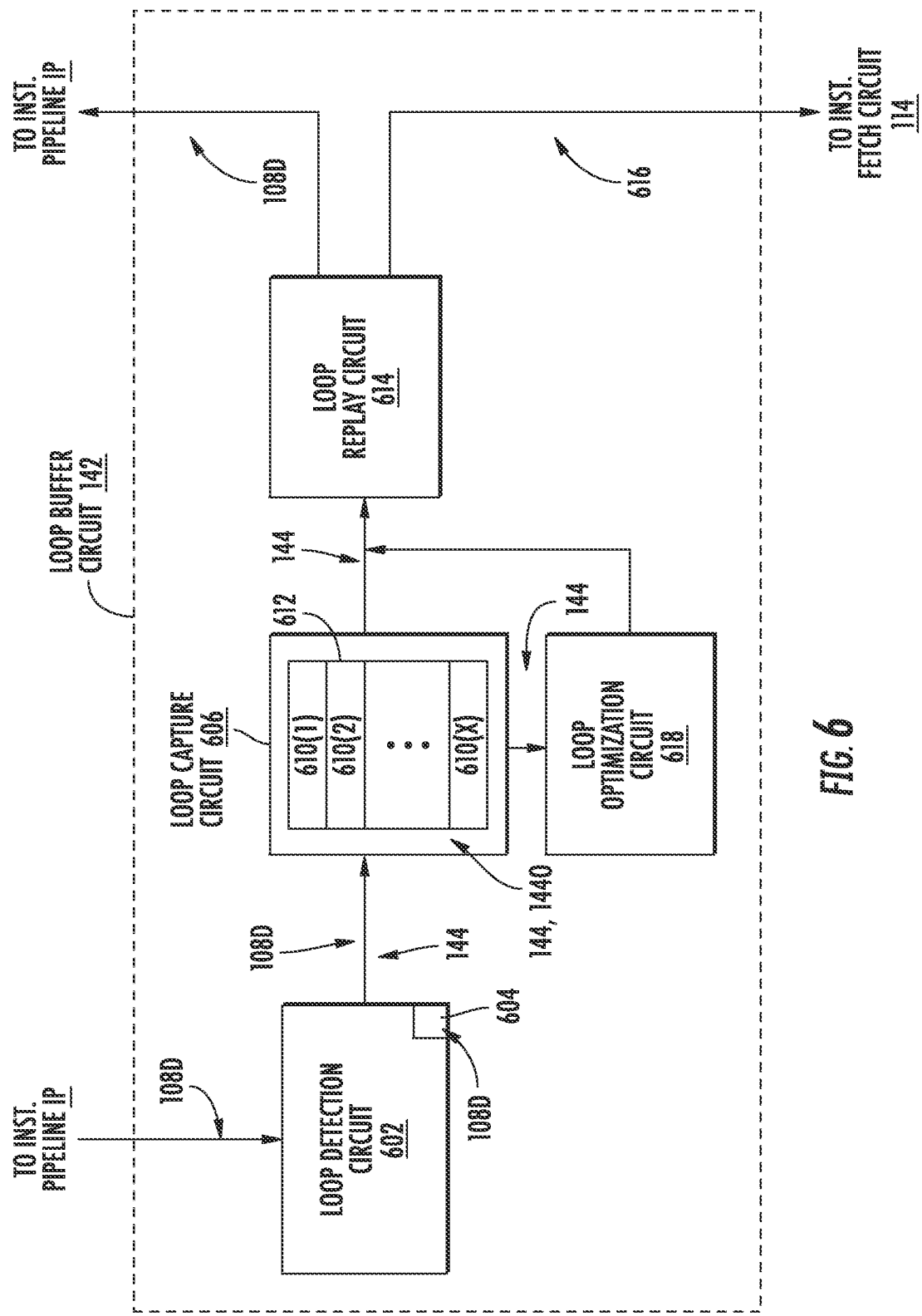
Figure 7:
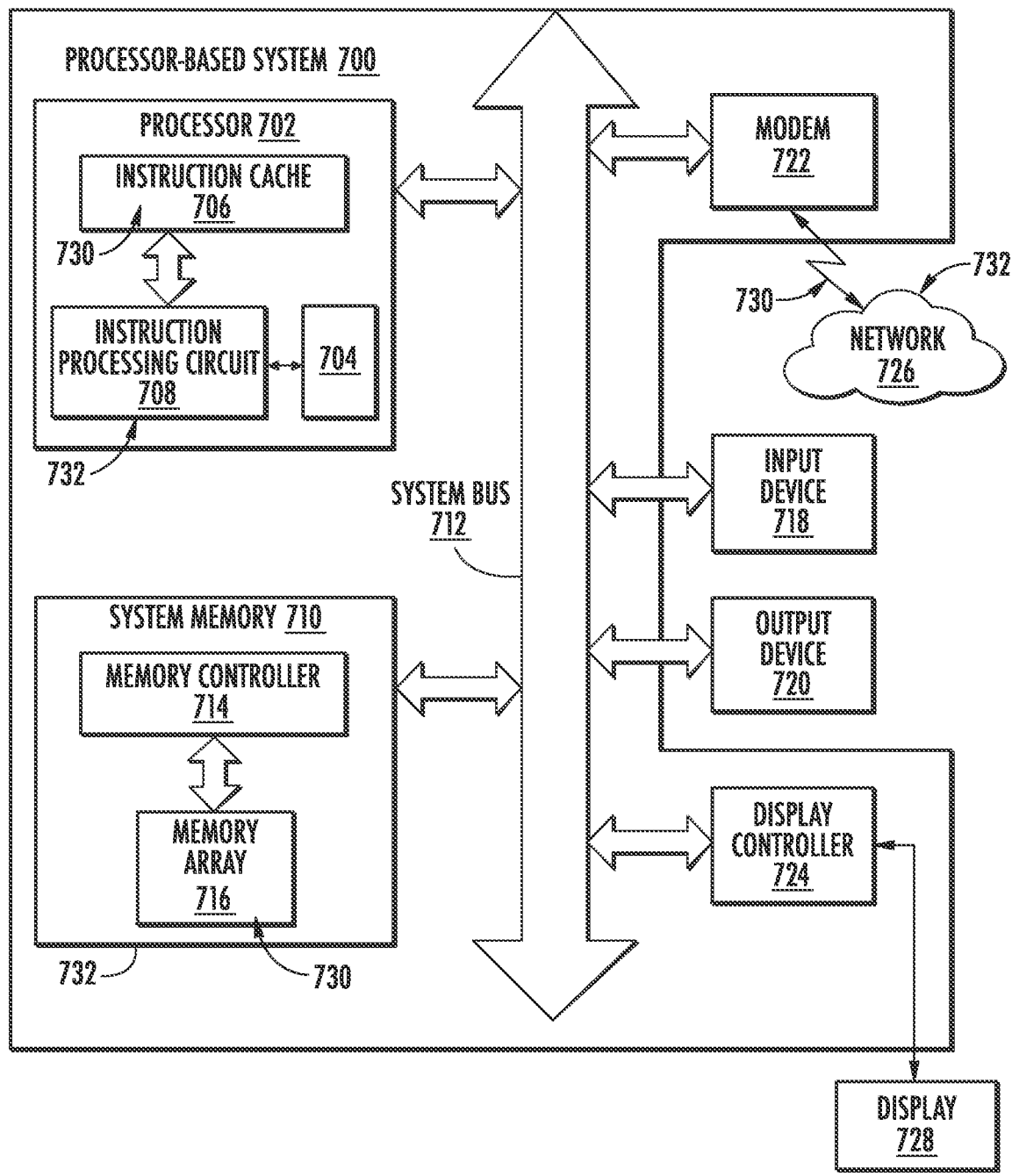

FIG. 6 is a diagram of an exemplary loop buffer circuit that can be provided in the processor in FIG. 1, that includes a loop detection circuit configured to detect loops in the instruction stream in an instruction pipeline, a loop capture circuit configured to capture instructions for a detected loop, and a loop replay circuit configured to replay optimized loops based on the captured loops with such loop optimization(s) in the instruction pipeline; and FIG. 7 is a block diagram of an exemplary processor-based system that includes a processor and an instruction processing circuit with one or more instruction pipelines for processing computer instructions for execution, wherein the processor is configured to speculatively predict a fetched predicted control instruction and reuse entries in a BIQ circuit for multiple instances of predicted control instructions speculatively predicted in a captured loop.

DETAILED DESCRIPTION

Exemplary aspects disclosed herein include reuse of branch information queue entries for multiple instances of predicted control instructions in captured loops in a processor. Related methods and computer-readable media are also disclosed. The processor includes an instruction processing circuit configured to fetch computer program instructions ("instructions") into an instruction stream in an instruction pipeline(s) to be processed and executed. The processor is configured to speculatively predict a condition or target of a fetched predicted control instruction (e.g., branch instruction) (referred to a speculatively predicting the predicted control instruction) to fetch younger instructions in the predicted instruction flow path for processing. In response to a speculative prediction, the processor is configured to establish and update a branch entry in a branch information queue (BIQ) circuit with branch information associated with predicted control instruction. For example, the branch information can be used in combination with a branch prediction history for making and tracking flow path predictions for predicted control instructions as well as verifying such predictions against the resolution of the predicted control instructions (e.g., its condition or target) when executed. Misprediction recovery efforts can be taken in response to a detected misprediction, such as flushing and re-fetching of instructions in the correct instruction flow path. The branch information stored in the BIQ circuit can also be used to reverse the effect of a mispredicted predicted control instruction on the branch prediction history as part a misprediction recovery, so that the misprediction does not negatively affect future predictions of the predicted control instruction. In exemplary aspects, to avoid the need to establish a separate branch entry in the BIQ circuit for each instance of a predicted control instruction within a loop for each iteration of the loop, the processor is configured to reuse the same branch entry in the BIQ circuit for each instance of the predicted control instruction. This is available because the branch information for each instance of a predicted control instruction within a loop remains consistent for each iteration of the loop. This conserves space in the BIQ circuit, which allows for a smaller sized BIQ circuit to be used thus conserving area and power consumption.

In this regard, FIG. 1 is a diagram of an exemplary processor 100 that is part of a processor-based system 102. The processor 100 may be an in-order or an out-of-order processor (OoP) as a non-limiting example. As discussed in more detail below, the processor 100 includes an exemplary instruction processing circuit 104 that includes a speculative prediction circuit 106 configured to make speculative predictions for fetched predicted control instructions 108F-C as part of fetched instructions 108F in an instruction stream 110 based on a speculative prediction history related to the predicted control instructions 208F-C. The processor 100 is configured to update branch information in a branch information queue (BIQ) circuit 112 used for making, tracking, and resolving such predictions. As also discussed in more detail below, the processor 100 is also configured to reuse entries in the BIQ circuit 112 for multiple instances of predicted control instructions 208F-C in captured loops from the instruction stream 110.

With reference to FIG. 1, the processor 100 in this example includes the instruction processing circuit 104 that includes an instruction fetch circuit 114 configured to fetch instructions 108 from an instruction memory 116. The instruction memory 116 may be provided in or as part of a cache memory or system memory in the processor-based system 102 as an example. The instruction fetch circuit 114 in this example is configured to provide the instructions 108 as fetched instructions 108F into an instruction pipeline IP as the instruction stream 110 in the instruction processing circuit 104 to be decoded in a decode circuit 118. The decode circuit 118 decodes the fetched instructions 108F into decoded instructions 208D that are processed before eventually being executed in an execution circuit 120. The produced value generated by the execution circuit 120 from executing a decoded instruction 108D is committed (i.e., written back) to a storage location indicated by the destination of the decoded instruction 108D. This storage location could be memory 122 in the processor-based system 102 or a physical register Po-Px in a physical register file (PRF) 124, as examples.

With continuing reference to FIG. 1, once fetched instructions 108F are decoded into decoded instructions 108D, the decoded instructions 108D are provided to a rename/allocate circuit 126 in the instruction processing circuit 104 in this example. The rename/allocate circuit 126 is configured to determine if any register names in the decoded instructions 108D need to be renamed to break any register dependencies that would prevent parallel or out-of-order processing. The rename/allocate circuit 126 is also configured to call upon a register map table (RMT) 128 to rename a logical source register operand and/or write a destination register operand of a decoded instruction 108D to available physical registers Po-Px in the PRF 124. The RMT 128 contains a plurality of mapping entries each mapped to (i.e., associated with) a respective logical register Ro-RP. The mapping entries are configured to store information in the form of an address pointer to point to a physical register Po-Px in the PRF 124. Each physical register Po-Px in the PRF 124 contains a data entry 130(0)-130(X) configured to store data for the source and/or destination register operand of a decoded instruction 108D.

The processor 100 also includes the speculative prediction circuit 106 that is configured to speculatively predict a value associated with an operation in the processor 100. For example, the speculative prediction circuit 106 may be configured to predict a fetched predicted control instruction 108F-C, such as a conditional branch instruction or indirect branch instruction whose branch target is stored at a memory address that is loaded, that will govern in which instruction flow path, next instructions 108 are fetched by the instruction fetch circuit 114 for processing. For example, if the predicted control instruction 108F-C is a conditional branch instruction, the speculative prediction circuit 106 can predict whether a condition of the conditional branch instruction 108F-C will be later resolved in the execution circuit 120 as either "taken" or "not taken." In this example, the speculative prediction circuit 106 is configured to consult a prediction history indicator 132 to make a speculative prediction. As an example, the prediction history indicator 132 contains a global history of previous predictions. The prediction history indicator 132 can be hashed with the program counter (PC) of a current predicted control instruction 108F-C to be predicted in this example to generate a prediction index into a prediction table circuit 134. The prediction table circuit 134 contains a prediction value (e.g., a counter value) that is mappable to a predicted control instruction 108F-C based on a prediction index assigned to predicted control instruction 108F-C. As discussed in more detail below, prediction indexes for predicted control instructions 108F-C can be stored in the BIQ circuit 112. The indexed prediction value in the prediction table circuit 134 is used to generate a current speculative prediction for the predicted control instruction 108F-C. In this manner, predictions of newly fetched predicted control instructions 108F-C are based on recent and historical resolutions of predicted control instructions in the instruction processing circuit 104. The prediction value will be used to determine whether the instruction fetch circuit 114 fetches next instructions 108 following (i.e., younger than) the conditional branch instruction 108F-C in the taken instruction flow path or not taken instruction flow path.

If the resolved outcome a speculatively predicted decoded predicted control instruction 108D is determined to have been mispredicted in execution, the instruction processing circuit 104 can perform a misprediction recovery. In this regard, in this example, the execution circuit 120 issues a flush event 136 to a commit/flush circuit 138. The commit/flush circuit 138 is configured to stall the instruction pipeline IP and flush instructions 108F, 108D in the instruction pipeline IP in the instruction processing circuit 104 that are younger than the mispredicted predicted control instruction 108. In this regard, the commit/flush circuit 138 is configured to consult with a reorder buffer circuit 140 that stores and maintains the order of fetched instructions 108F into the instruction pipeline IP. The rename/allocate circuit 126 is configured to insert decoded instructions 208D into entries in the reorder buffer circuit 140 as part of the in-order section of the instruction processing circuit 104 before the decoded instructions 108D are scheduled for execution by a scheduler circuit 143. The scheduler circuit 143 can schedule decoded instructions 108D for execution out-of-order based on their dependencies and when their source data is available. In this manner, the reorder buffer circuit 140 can be used by the commit/flush circuit 138 to identify instructions 108 younger than the mispredicted predicted control instruction 108 for flushing. The commit/flush circuit 138 can then direct the instruction fetch circuit 114 to fetch new instructions 108 in the instruction pipeline IP from the correct instruction flow path for the predicted control instruction 108 based on the resolution of the speculatively predicted decoded predicted control instruction 108D.

When a mispredicted predicted control instruction 108 is resolved and a flush event 136 is generated, the instruction processing circuit 104 is also configured to update the prediction history indicator 132 and the BIQ circuit 112 as part of prediction training. This is so that the previous updating of a prediction history indicator 230 and the BIQ circuit 112 based on the mispredicted predicted control instruction 108 can be reversed in essence to not affect future predictions of predicted control instruction 108 including in the correct instruction flow path from the mispredicted predicted control instruction 108 after flushing. In this regard, the prediction history indicator 132 is updated in response to a flush event 136 so that future predictions are based on the resolution of the predicted control instructions 108 to improve prediction accuracy. The BIQ circuit 112 is also updated in response to a flush event 136, so that the prediction value at the prediction index in the prediction table circuit 134 previously indexed and accessed to predict the mispredicted predicted control instruction 108 is updated (i.e., trained) to record the misprediction. For example, the prediction value at a prediction index in the prediction table circuit 134 may be decremented to indicate a misprediction. The prediction value at a prediction index in the prediction table circuit 134 may be incremented to indicate a correct prediction. In this manner, the prediction value at a prediction index in the prediction table circuit 134 can be used to indicate a prediction (e.g., taken or not taken) as well as a confidence or strength of such prediction for future predictions that access the prediction value at the same prediction index in the prediction table circuit 134.

The instructions 108 in the instruction stream 110 in the instruction pipeline IP in FIG. 1 may contain loops. A loop is a sequence of instructions 108 in the instruction stream 110 that repeat (i.e., process) sequentially in a back-to-back arrangement. Note that a loop can include further internal loops. A loop can be present in the instruction stream 110 as a result of a programmed software construct that is compiled into a loop among the instructions 108. A loop can also be present in the instruction stream 110 as a result of instructions 108 being repeated in a sequence in the instruction stream 110 even if not part of a higher-level, programmed, software construct, such as based on binary instructions resulting from compiling of a higher-level, programmed, software construct. If instructions 108 that are part of a loop could be detected when such instructions 108 are processed in an instruction pipeline IP, these instructions 108 could be captured and replayed into the instruction stream 110 in processing stages in the instruction pipeline IP without having to re-fetch and/or re-decode such instructions 108, for example, for the subsequent iterations of the loop. Thus, a sequence of instructions 108 that is detected and captured as a captured loop can capture one path of a loop and thus appear to be a branch-free loop body that does not have further internal branches. For example, if loop has alternating conditions of branch taken and not taken, two (2) loops can be captured to represent the overall loop.

In this regard, the instruction processing circuit 104 in FIG. 1 in this example includes a loop buffer circuit 142 to perform loop buffering. The loop buffer circuit 142 is configured to detect a loop 144 in instructions 108 fetched into the instruction pipeline IP as the instruction stream 110 to be processed and executed. In response to a detected loop 144, the loop buffer circuit 142 is configured to capture (i.e., loop buffer) the instructions 108 in the detected loop to be replayed to avoid or reduce the need to re-fetch the instructions 108 in the detected loop, since the processing of these instructions 108 is repeated in the instruction pipeline IP. In this regard, the loop buffer circuit 142 is configured to insert (i.e., replay) the captured loop instructions 108 in the detected loop 144 in the instruction pipeline IP for iterations of the loop 144. In this manner, the instructions 108 in the captured loop do not have to be re-fetched and/or re-decoded, for example, for the subsequent iterations of the loop 144. Thus, loop buffering can conserve power by the instruction fetch circuit 114 not having to re-fetch the instructions 108 in a detected loop 144 for subsequent iterations of the loop 144. Loop buffering can also conserve power by the decode circuit 118 not having to re-decode the instructions 108 in a detected loop 144 for subsequent iterations of the loop 144.

FIG. 2 is an exemplary instruction stream 110 of fetched instructions 108F in the processor 100 in FIG. 1 to illustrate exemplary loops that are present in the instruction stream 110. As shown in FIG. 1, the instruction stream 110 contains three (3) iterations 146(0)-146(2) of the loop 144. The loop 144 in this example consists of instructions I0-I3 as part of instructions 108 that include a respective load instruction I0, add instruction I1, compare instruction I2, and branch instruction I3. These instructions I0-I3 in the loop 144 were fetched into the instruction stream 110 three (3) times in three (3) iterations 146(0)-146(2) of the loop 144, meaning that the instructions I0-I3 in the loop 144 are repeated three (3) times in the instruction stream 110. As shown in FIG. 3, in response to the branch instruction I3 (as a predicted control instruction) being fetched into the instruction stream 110 in the instruction pipeline IP in FIG. 1 for a first instance of the branch instruction I3 in the first iteration 146(0) of the loop 144, a branch entry 300(0) among a plurality of branch entries 300(0)-300(B) is allocated in the BIQ circuit 112 for each branch instruction I3 in each loop iteration 146(0)-146 (2) of the loop 144. As discussed in more detail below, the processor 100 is configured to store branch information 302(0)-302(B) in a respective allocated branch entry 300 (0)-300(B) in the BIQ circuit 112 to be used to make speculative predictions for a predicted control instruction 108 associated with the branch entry 300(0)-300(B). In this example, the branch entry 300(0) will contain branch information 302(2) associated with the branch instruction I3 in the loop 144 that is used by the speculative prediction circuit 106 in FIG. 1 to make a speculative prediction of the branch instruction I3 to determine which flow path to fetch instructions following the branch instruction I3.

With continuing reference to FIGS. 2 and 3, when the branch instruction I3 repeats in the instruction stream 110 in the second iteration 146(1) of the loop 144, the loop buffer circuit 142 is configured to detect the repeated load instruction I0 as a second instance of the load instruction I0. The loop buffer circuit 142 is also configured to detect the repeated add, compare, and branch instructions I1-I3 in the second iteration 146(1) of the loop 144 as second instances of such instructions I1-I3. In response, the loop buffer circuit 142 detecting the loop 144 by detecting the second, repeated instances of the instructions I0-I3 in the second iteration 146(1), the loop buffer circuit 142 detects the instructions I0-I3 as loop instructions I0-I3 as part of the detected loop 144. The loop buffer circuit 142 is configured to capture the loop instructions I0-I3 as part of a captured loop 144. In this manner, as discussed above in FIG. 1, the loop buffer circuit 142 is configured to insert (i.e., replay) the captured loop instructions I0-I3 from the detected loop 144 in the instruction pipeline IP for iterations of the loop 144, including the third iteration 146(2) of the loop 144 shown in FIG. 2. In this manner, the loop instructions I0-I3, 108 in the captured loop do not have to be re-fetched and/or re-decoded, for example, for the subsequent iterations of the loop 144. Thus, loop buffering can conserve power by the instruction fetch circuit 114 in FIG. 1 not having to re-fetch the instructions 108, I0-I3 in the detected loop 144 for subsequent iterations 146 of the loop 144. Loop buffering can also conserve power by the decode circuit 118 in FIG. 1 not having to re-decode the instructions 108, I0-I3 in the detected loop 144 for subsequent iterations of the loop 144.

With continuing reference to FIG. 2, branch information for each instance of the branch instruction I3 in each respective iteration 146(0)-146(2) of the loop 144 within a loop remains consistent, because the loop 144 is a repetition of the same instructions I0-I3 repeated consecutively in the instruction stream 110. Thus, in this example, to avoid the need to establish a separate branch entry 300 in the BIQ circuit 112 for each instance of the branch instruction I3 for each iteration 146(2)-146(2) of the loop 144, the processor 100 in FIG. 1 is configured to reuse the same branch entry 300(0) in the BIQ circuit 112 for each instance of the branch instruction I0-I3 for each iteration 146(2)-146(2) of the loop 144. This conserves space in the BIQ circuit 112, which allows for a smaller sized BIQ circuit 112 to be used thus conserving area and power consumption in the processor 100.

FIG. 3 also illustrates an exemplary state of the BIQ circuit 112 with the branch information 302(0) established in the branch entry 300(0) for the branch instruction I3 in the instruction stream 110 in FIG. 2. As shown in FIG. 3, the BIQ circuit 112 includes the plurality of branch entries 300(0)-300(B) that are each configured to store branch information 302(0)-302(B) about a predicted control instruction 108 fetched and processed in the instruction pipeline IP. The branch information 302(0)-302(B) in the BIQ circuit 112 is maintained by the speculative prediction circuit 106 in FIG. 1 in this example. The branch information 302(0)-300(B) in this example includes a respective predicted control instruction identifier 304(0)-304(B) to identify an inserted predicted control instruction 108, which may be the branch PC of the predicted control instruction 108. For example, in the predicted control instruction identifier 304(0) in the branch information 302(0) in the branch entry 300(2) in the BIQ circuit 112 for instruction I3 in loop 144 in FIG. 2, the value of the PC of the branch instruction I3 of 0x1014 is stored as an example. In this manner, if another instance of the branch instruction I3 is encountered in the instream stream, the branch information 302(0) in the BIQ circuit 112 can be determined containing branch information 302(0) for the next instance of the branch instruction I3 to be reused for its speculative prediction.

The branch information 302(0)-302(B) also includes a respective hit table indicator 306(0)-306(B), set number indicator 308(0)-308(B), and entry tag 310(0)-310(B) to collectively provide a prediction address pointer providing a prediction index into the prediction table circuit 134 in FIG. 1, to obtain a prediction for the respective predicted control instruction 101 for the branch entry 300(0)-300(B). For example, in the branch information 302(0) in the branch entry 300(2) in the BIQ circuit 112 for instruction I3, the value of '2', '15, and 0x1a" are stored in the respective hit table indicator 306(0), set number indicator 308(0), and entry tag 310(0), to be used to access a stored prediction value in the prediction table circuit 134 in FIG. 1 to determine a branch prediction for instruction I3. The hit table indicator 306(0)-306(B), set number indicator 308(0)-308(B), and entry tag 310(0)-310(B) may be determined by the speculative prediction circuit 106 for a given predicted control instruction 108 based on the prediction history indicator 132 and a hash of the PC of the predicted control instruction 108. The separate hit table indicator 306(0)-306(B), set number indicator 308(0)-308(B), and entry tag 310(0)-310(B) are provided in the branch entries 300(0)-300(B) in this example, because the prediction table circuit 134 may include multiple prediction table circuits that each have different sets and entries within each set. Thus, the hit table indicator 306(0)-306(B), set number indicator 308(0)-308(B), and entry tag 310(0)-310(B) can be used to identify a specific prediction table circuit 134, set within that specific prediction table circuit 134, and entry within that set in this example.

With continuing reference to FIG. 3, each branch entry 300(0)-300(X) also includes a respective prediction entry 312(0)-312(B) and actual entry 314(0)-314(B) to store a speculative prediction a respective predicted control instruction 108 and an actual resolution of the condition of a respective predicted control instruction 108. This information is used by the speculative prediction circuit 106 for handling misprediction recovery in response to a mispredicted predicted control instruction 108. For example, in prediction entry 312(0) in the branch entry 300(2) in the BIQ circuit 112 for instruction I3 indicates a stored state of 'NT,' meaning not taken, was stored as the speculative prediction made for branch instruction I3. Also in this example, the actual entry 314(0) in the branch entry 300(2) in the BIQ circuit 112 for instruction I3 indicates a stored state 'NT,' meaning not taken. Thus, the processor 100 can use this information to determine if the speculative prediction for the branch instruction I3 was correctly predicted or not. If not, misprediction recovery actions can be taken to remedy the misprediction of branch instruction I3, such as to flush younger instructions 108 fetched from the mispredicted flow path from the branch instruction I3, as well as flushing any younger additional predicted control instructions from the BIQ circuit 112 fetched from the mispredicted flow path. As will as be discussed in more detail below, misprediction recovery can also involve backing out any settings to the prediction history indicator 132 based on predicted control instructions 108 fetched from the incorrect flow path following the mispredicted predicted control instruction 108.

Each branch entry 300(0)-300(B) can also include a respective valid indicator indicating if a respective branch entry 300(0)-300(B) is valid. For example, when a predicted control instruction 108 stored in a branch entry 300(0)-300(B) is resolved, the branch entry 300(0)-300(B) may be reused for another processed predicted control instruction 108. The valid indicator can be set to an invalid state if the respective branch entry 300(0)-300(0) is not valid at a given time.

Also, as shown in FIG. 3, each branch entry 300(0)-300(X) also includes a respective instance indicator 316(0)-316(M) to be able to reuse branch entries 300(0)-300(X) for multiple instances of a predicted control instruction 108 in the detected loop 144, such as branch instruction I3 in FIG. 2 for example. The instance indicator 316(0)-306(M) is used to store the number of instances that a respective predicted control instruction 108 has been included in the instruction stream 110 in FIG. 1, whether by fetching of the predicted control instruction 108 or replaying of the predicted control instruction 108 as part of replaying a detected loop 142. For example, as shown in branch entry 300(0) for branch instruction I3, the instance indicator 316(0) is a counter that stores the value of '2' to indicate that there are three pending (3) instances of the branch instruction I3 in the instruction stream 110. The processor 100 increments the instance indicator 316(0) in this example for each instance of the branch instruction I3 in each loop iteration 146(0)-146(X). In this example, when a branch entry 300(0)-300(B) is established in a first instance of predicted control instruction 108, the respective instance indicator 316(0)-306(B) is set or initialized to zero (0). In this manner, as the additional instances of the branch instruction I3 are encountered in the instruction stream 110, the same branch information 302(0) in the branch entry 300(0) established for the branch instruction I3 can be used to make speculative predictions and to perform other prediction related functions and processing. Each time an instance of the branch instruction I3 is resolved in execution by the execution circuit 120 in FIG. 1, in this example, the value stored in instance indicator 316(1) is decremented. When the instance indicator 316(1) is decremented back to zero (0), this means that all instances of the branch instruction I3 have been resolved due to the exit of the loop 144 in which the branch instruction I3 is included. In this instance, the branch entry 300(0) can be de-allocated (for example set to invalid), to be reused to store branch information another predicted control instruction 108 encountered in the instruction stream 110.

Figure 4A:
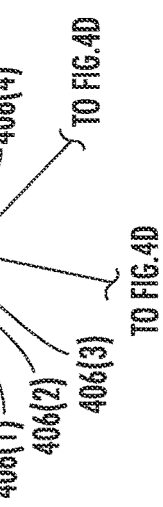
FIG. 4A is a diagram of an exemplary predicted branch recovery trace record that can be included in the processor in FIG. 1, illustrating predicted control instructions in fetch order and an exemplary speculative prediction of each predicted control instruction.
Figure 4B:
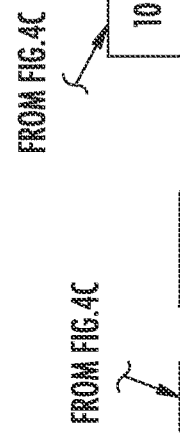
FIG. 4B is a diagram of an exemplary actual branch recovery trace record that can be included in the processor in FIG. 1, illustrating predicted control instructions and an actual resolution of the predicted control instructions in execution.
Figure 4C:
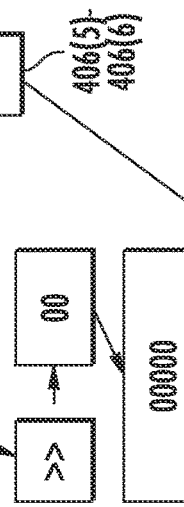
FIG. 4C is a diagram of an exemplary speculative and non-speculative history that can be included in the processor in FIG. 1 and used by the speculative prediction circuit in FIG. 1 to make speculative predictions.

To further illustrate misprediction recovery for speculatively mispredicted predicted control instructions 108 by the speculative prediction circuit 106 in FIG. 1, FIGS. 4A-4D are provided. FIG. 4A is a diagram of an exemplary predicted branch recovery trace record 400 of fetched predicted control instructions 108F predicted in the instruction processing circuit 104 in FIG. 1. As shown therein, a first predicted control instruction 108(1) fetched by the instruction processing circuit 104 in FIG. 1 is shown as being from branch PC (BRPC) 0x1014, which is the branch instruction I3 in FIG. 2. The speculative prediction circuit 106 predicted the predicted control instruction 108(1) as not taken (NT) in this example. In this regard, the speculative prediction circuit 106 uses the prediction history indicator 132 to generate a prediction index into the prediction table circuit 134 in FIG. 1 as discussed above, to make the NT prediction for predicted control instruction 108(1) at BRPC 0x1014. As shown in FIG. 4C, in this example, the prediction history indicator 132 is made up of a non-speculative prediction history indicator 132NS and a speculative prediction history indicator 132S. The non-speculative prediction history indicator 132NS has resolved entries 404 (e.g., bits) that can each store a record of the resolution of previously executed predicted control instructions 108 in the instruction processing circuit 104. For example, a '0' bit stored in a resolved entry 404 can indicate NT resolution, and a '1' bit stored in a resolved entry 404 can indicate a taken (T) resolution.

The speculative prediction history indicator 132S shown in FIG. 4C is also an indicator that has unresolved prediction entries 406 (e.g., bits) that can each store a record of unresolved predictions made for predicted control instructions 108 in the instruction processing circuit 104 that have not yet been executed. Again, as an example, a '0' bit stored in a prediction entry 406 indicates a NT prediction, and a '1' bit stored in a prediction entry 408 indicates a T prediction. Thus, as shown in FIG. 4C, in the speculative prediction history indicator 132S, the recorded bits of '010110' in the unresolved prediction entries 408 indicate a sequential prediction history (left-most bit being oldest, and right-most bit being youngest), of NT, T, NT, T, T, NT. The recorded bit of '0' in the left-most prediction entry 408(1) in the speculative prediction history indicator 132S represents the NT prediction for predicted control instruction 108(1). The speculative prediction history indicator 132S is appended to the non-speculative prediction history indicator 132NS to form the prediction history indicator 132 used by the speculative prediction circuit 106 to make predictions of predicted control instructions 108. In this manner, the prediction history indicator 132 reflects a history of predictions that include both resolved and unresolved predictions.

With continuing reference to FIG. 4A, as a result of the NT prediction of predicted control instruction 108(1), the instruction fetch circuit 114 (FIG. 1) fetches next, younger instructions 108 in the NT instruction flow path for predicted control instruction 108(1). In this regard, as an example, as shown in the predicted branch recovery trace record 400, predicted control instruction 108(2) at BRPC 0x1022 is the next encountered predicted control instruction in the NT instruction flow path for predicted control instruction 108(1). As shown in FIG. 4A, the predicted control instruction 108(2) is predicted by the speculative prediction circuit 106 (FIG. 1) as T-based on the speculative prediction history indicator 132S. The speculative prediction history indicator 132S has a recorded '0' in prediction entry 406(1) for a NT prediction for the predicted control instruction 108(1) as shown in FIG. 4C. The speculative prediction circuit 106 then records the T prediction as a '1' bit for predicted control instruction 108(2) in the speculative prediction history indicator 132S of the prediction history indicator 132 as shown in FIG. 4C. This is so that future predictions are based on an updated speculative prediction history indicator 132S that includes recorded predictions for predicted control instruction 108(1) and predicted control instruction 108(2). The predicted branch recovery trace record 400 in FIG. 4A shows subsequent younger predicted control instructions 108(3)-108(6) processed by the instruction processing circuit 104 in FIG. 1 and their predictions made by the speculative prediction circuit 106.

FIG. 4B illustrates an actual branch recovery trace record 402 that shows the resolutions of the predicted control instruction 108(1)-108(6) based on the execution. As shown in FIG. 4B, the NT prediction for predicted control instruction 108(1) was resolved as correct, but the T prediction for predicted control instruction 108(2) was resolved as being incorrect. The correct resolution for predicted control instruction 108(2) is NT, and this the prediction of NT for predicted control instruction 108(2) by the speculative prediction circuit 106 was incorrect. This means that younger predicted control instructions 108(3), 108(4) shown in the predicted branch recovery trace record 400 in FIG. 4A were fetched in error. This is because predicted control instructions 108(3), 108(4) are control dependent (CD) on mispredicted predicted control instruction 108(2). Predicted control instructions 108(5), 108(6) are instructions that are located at the merge point of predicted control instruction 108(2). Thus, predicted control instructions 108(5), 108(6) are CI instructions that are present in both the taken T and not taken NT instruction flow paths from predicted control instruction 108(2) as shown in the predicted and actual branch recovery trace records 400, 402 in FIGS. 4A and 4B, respectively.

In response to the detection of the misprediction of predicted control instruction 108(2), the execution circuit 120 in FIG. 1 issues the flush event 136 to flush predicted control instructions 108(3), 108(4) and to fetch instructions 108 in the correct, NT instruction flow path from predicted control instructions 108(2) in misprediction recovery. The fetched instructions 108F in the correct, NT instruction flow path from predicted control instructions 108(2) are shown in the actual branch recovery trace record 402 as predicted control instructions 108(7)-108(9), 108(5), and 108(6). As discussed above, predictions of newly fetched predicted control instructions 108F are made based on the prediction history indicator 132 that includes the speculative prediction history indicator 132S. Thus, because in this example the speculative prediction history indicator 132S was updated based on the misprediction of predicted control instruction 108(2), if the speculative prediction history indicator 130S is not also updated in response to a flush event 136 in misprediction recovery, the speculative prediction history indicator 132S will not accurately reflect the prediction history. This is because the prediction for predicted control instruction 108(2) as well as the flushed younger predicted control instructions 108(3), 108(4) would still be present in the speculative prediction history indicator 132S otherwise. The prediction entry 406(2) for predicted control instruction 108(2) in the speculative prediction history indicator 132S would be T (e.g., a '1' bit) instead of NT (e.g., a '0' bit) if the speculative prediction history indicator 132S was not updated in response to a flush event 136 in misprediction recovery. Also, the predictions for predicted control instructions 108(3), 108(4) in the speculative prediction history indicator 132S may be inaccurate, because predicted control instructions 108(3), 108(4) were only fetched due to the misprediction of predicted control instruction 108(2), and are flushed in the instruction pipeline IP in misprediction recovery.

Figure 4D:
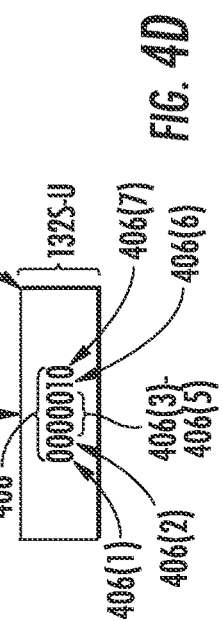
FIG. 4D is a diagram of an exemplary speculative history based on a speculative prediction of the predicted control instructions in FIGS. 4A and 4B, before a misprediction recovery used by the speculative prediction circuit in predicted control instructions to make speculative predictions, and a restored speculative history resulting from misprediction recovery.

Thus, as shown in FIG. 4D, the instruction processing circuit 104 can be configured to update the speculative prediction history indicator 132S of the prediction history indicator 132 as the updated speculative prediction history indicator 132S-U in response to a flush event 136 in misprediction recovery. FIG. 4D shows an updated speculative prediction history indicator 132S-U that has recorded bits '0000010' (i.e., NT, NT, NT, NT, NT, T, NT) in prediction entries 406(1)-406(7) to reflect updated predictions for predicted control instructions 108(1)-108(2), 108(7)-108(9), 108(5)-108(6), respectively, according to the actual branch recovery trace record 402 in FIG. 4B. Note that the updated prediction entry 406(2) in the updated speculative prediction history indicator 132S-U for predicted control instruction 108(2) is now '0' meaning NT. Newly fetched predicted control instructions 108(7)-108(9) are predicted based on the more accurate, updated speculative prediction history indicator 132S-U instead of the previous speculative prediction history indicator 132S that contains an incorrect prediction for predicted control instruction 108(2) and predictions for predicted control instructions 108(3), 108(4) that were fetched in the incorrect instruction flow path for predicted control instruction 108(2).

Figure 5:
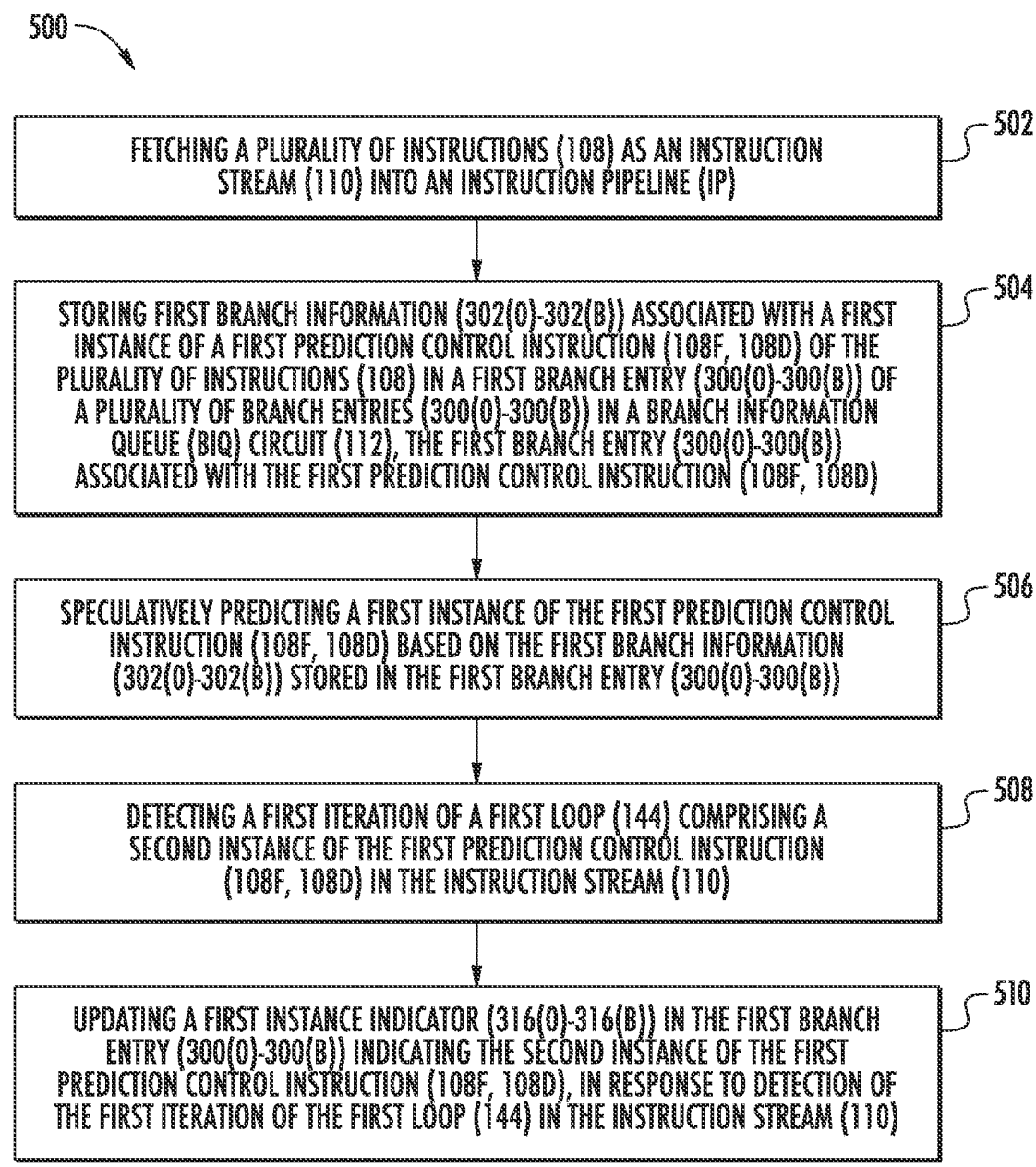
FIG. 5 is a flowchart illustrating an exemplary process of the processor in FIG. 1, speculatively predicting a fetched predicted control instruction and reusing entries in a BIQ circuit for multiple instances of predicted control instructions speculatively predicted in a captured loop.

Now, more exemplary detail is discussed on the processor 100 in FIG. 1, and its speculative prediction circuit 106 for example, speculatively predicting a condition of a predicted control instruction 108F, 108D and reusing branch entries 300(0)-300(B) in the BIQ circuit 112 for multiple instances of predicted control instructions 108F, 108D speculatively predicted in a captured loop. For example, FIG. 5 is a flowchart illustrating an exemplary process 500 of the processor 100 in FIG. 1, and its speculative prediction circuit 106 for example, speculatively predicting a predicted control instruction 108F, 108D and reusing branch entries 300(0)-300(B) in the BIQ circuit 112 for multiple instances of predicted control instructions 108F, 108D speculatively predicted in a captured loop, such as the loop 144 in FIG. 2. The exemplary process 500 in FIG. 5 is discussed in reference to the processor 100 in FIG. 1, the loop 144 in the instruction stream 110 in FIG. 2, and the BIQ circuit 112 in FIG. 3.

In this regard, as shown in FIG. 5, a first step of the process 500 can include fetching a plurality of instructions 108 as an instruction stream 110 into an instruction pipeline IP (block 502 in FIG. 5). A next step in the process 500 can then include storing first branch information 302(0-302(B)) associated with a first instance of a first predicted control instruction 108F, 108D of the plurality of instructions 108 in a first branch entry 300(0)-300(B) of a plurality of branch entries 300(0)-300(B) in the BIQ circuit 112 (block 504 in FIG. 5). The first branch entry 300(0)-300(B) established in the BIQ circuit 112 is associated with the first predicted control instruction 108F, 108D (block 504 in FIG. 5). A next step in the process 500 can then include speculatively predicting the first instance of the first predicted control instruction 108F, 108D based on the first branch information 302(0)-302(B) stored in the first branch entry 300(0)-300(B) (block 506 in FIG. 5). A next step in the process 500 can then include detecting a first iteration of a first loop 144 comprising a second instance of the first predicted control instruction 108F, 108D in the instruction stream 110 (block 508 in FIG. 5). Then updating a first instance indicator 316(0)-316(B) in the first branch entry 300(0)-300(B) indicating the second instance of the first predicted control instruction 108F, 108D, in response to detection of the first iteration of the first loop 144 in the instruction stream 110 (block 510 in FIG. 5).

More exemplary information and operation of the processor 100 in FIG. 1 reusing the branch entries 300(0)-300(B) in the BIQ circuit 112 to store branch information 302(0)-302(B) for multiple instances of such predicted control instructions 108 in a loop 144 and performing speculative predictions of predicted control instructions 108 based on such branch information is now discussed.

With reference to FIG. 1, the instruction processing circuit 104 and/or its speculative prediction circuit 106 is configured to detect multiple instances of a predicted control instruction 108F, 108D in a detected loop 144. The instruction processing circuit 104 and/or its speculative prediction circuit 106 is configured to update (e.g., increment), the respective instance indicator 316(0)-306(B) in the respective branch entry 300(0)-300(B) established for the predicted control instruction 108F, 108D in the BIQ circuit 112, to track the number of instances of the predicted control instruction 108F, 108D in the instruction pipeline IP that have not yet been resolved. When a speculative prediction of a predicted control instruction 108F, 108D is made, the prediction entry 312(0)-312(B) in the branch entry 300(0)-300(B) corresponding to the predicted control instruction 108F, 108D is updated with the prediction of the predicted control instruction 108F, 108D in the BIQ circuit 112. When an instance of a predicted control instruction 108F, 108D is resolved, the actual entry 314(0)-314(B) in the branch entry 300(0)-300(B) corresponding to the predicted control instruction 108F, 108D is updated in the BIQ circuit 112 with the resolution (e.g., taken or not taken for a conditional control instruction 108F, 108D). As discussed above, the respective instance indicator 316(0)-306(B) in the respective branch entry 300(0)-300(B) established for the predicted control instruction 108F, 108D in the BIQ circuit 112 is updated based on the instances and then resolutions of predicted control instructions 108F, 108D to be able to in effect, reuse the branch entries 300(0)-300(B) established for the predicted control instruction 108F, 108D to make predictions and to track mispredictions for misprediction recovery tasks.

If a predicted control instruction 108F, 108D is determined to have been mispredicted based on the speculative prediction for the predicted control instruction 108F, 108D in its respective prediction entry 312(0)-312(B) and actual entry 314(0)-304(B) in in its corresponding branch entry 300(0)-300(B) in the BIQ circuit 112, misprediction recovery tasks can be performed. In one example, this involves deallocating or making available the branch entry(ies) 300(0)-300(B) corresponding to predicted control instructions 108F, 108D that are control dependent on the mispredicted predicted control instruction 108F, 108D in the BIQ circuit 112. This is because these branch entry(ies) 300(0)-300(B) corresponding to predicted control instructions 108F, 108D that are control dependent on the mispredicted predicted control instruction 108F, 108D are no longer valid, because these dependent predicted control instructions 108F, 108D were fetched based on a predicted control flow path of the mispredicted predicted control instruction 108F, 108D. Also in misprediction recovery, the processor 100 can restore the prediction history indicator 132 back to its previous state before such was updated based on the speculative prediction of the dependent predicted control instructions 108F, 108D dependent on the mispredicted predicted control instructions 108F, 108D. In this manner, the previous updating of the prediction history indicator 132 based on the speculative prediction of the dependent predicted control instructions 108F, 108D that were in the correct flow path from the mispredicted predicted control instructions 108F, 108D do not influence future speculative predictions in an undesired manner. The processor 100 can cause the instruction fetch circuit 114 in FIG. 1 to stall fetching of additional instructions 108 into the instruction pipeline IP until the prediction history indicator 132 is restored.

Note that a detected loop 144 can include multiple, nested predicted control instructions 108F, 108D as discussed above, in which each predicted control instructions 108F, 108D will be allocated its own branch entry 300(0)-300(B) in the BIQ circuit 112. The operation of updating the branch information 302(0)-302(B) and the instance indicator 316(0)-316(B) in such branch entries 300(0)-300(B) is as described above. The branch information 302(0)-302(B) in such branch entries 300(0)-300(B) for multiple, nested predicted control instructions 108F, 108D in a detected loop 144 is updated based on the resolution of its speculative prediction when executed, as previously described. The instance indicator 316(0)-316(B) in such branch entries 300(0)-300(B) for multiple, nested predicted control instructions 108F, 108D in a detected loop 144 is updated based on number of instances of such nested predicted control instructions 108F, 108D and their resolution by their execution. When all instances of a given predicted control instructions 108F, 108D in a detected loop 144 are resolved, and the loop 144 is exited, the corresponding branch entry 300(0)-300(B) to the given predicted control instructions 108F, 108D in the BIQ circuit 112 can be reused (e.g., deallocated, and re-allocated)

FIG. 6 is a diagram of an example the loop buffer circuit 142 that is included in the processor 100 in FIG. 1 to detect, capture, and replay detected loops 144. In this example, as shown in FIG. 6, the loop buffer circuit 142 in this example includes a loop detection circuit 602. The loop detection circuit 602 is coupled to the instruction pipeline IP and is configured to receive copies or instances of decoded instructions 108D in this example that are in the instruction stream 110 of the instruction processing circuit 104. The loop detection circuit 602 is configured to detect if a loop is present in the decoded instructions 108D in the instruction stream 110 in an instruction pipeline IP. If a loop is present, the loop will include a plurality of loop instructions 108D among the decoded instructions 108D. For example, the loop detection circuit 602 may include an instruction buffer circuit 604 that is configured to store decoded instructions 108D as they flow through an instruction pipeline IP after being decoded by the decode circuit 118 (FIG. 1). The loop detection circuit 602 can reference the stored instructions 108D to determine if follow-on younger instructions 108D repeat the captured instructions 108D. Stored instructions 108D that are detected by the loop detection circuit 602 to repeat sequentially in an instruction pipeline IP are deemed to be a captured loop.

In response to the loop detection circuit 602 detecting a loop of stored instructions 108D in the instruction stream 110 as a loop 144, the loop detection circuit 602 is configured to communicate the stored instructions 108D of the loop to a loop capture circuit 606 as a captured loop 144. The loop capture circuit 606 captures the detected loop instructions 108D for the capture loop 144 in 'X' number of instruction entries 610(1)-610(X) in a loop buffer memory 612. In this manner, the loop capture circuit 606 has a record and instance of the instructions 108D of the captured loop 144. Note that the loop buffer memory 612 can be provided as part of the loop capture circuit 606 and/or the loop buffer circuit 142 or as a separate memory circuit in the processor 100 in FIG. 1 as examples.

With continuing reference to FIG. 6, the loop buffer circuit 142 in this example also includes a loop optimization circuit 618. As discussed in a number of examples in more detail below, the loop optimization circuit 618 is configured to determine, based on the captured loop 144 captured by the loop capture circuit 606, if a loop optimization is available to be made for the captured loop 144. The loop optimization circuit 618 can be configured to analyze instructions 108D incrementally as they are captured by the loop capture circuit 606 or once the loop capture circuit 606 captures the fully captured loop 144. In response to the loop optimization circuit 618 determining that a loop optimization is available to be made for the captured loop 144, the loop optimization circuit 618 is configured to modify the captured loop 144 in the loop buffer memory 612 of the loop capture circuit 606 to produce an optimized loop 1440. An optimized loop 1440 is a modification of the instructions 108D in a captured loop 144 that is replayed to replay the captured loop 144 and/or a modification of how the captured loop 144 is processed in the instruction processing circuit 104 on replay, to potentially process the captured loop 144 more efficiently when replayed. This can increase the throughput of the replay of the captured loop 144 in the instruction processing circuit 104. A loop replay circuit 614 is configured replay the optimized loop 1440 for the captured loop 144 based on the modification of the captured loop 144 by the loop optimization circuit 618.

For example, certain loop optimizations may be available to be made by the loop optimization circuit 618 based on the captured loop 144 that reduce the number of instructions 108D required to be replayed in the captured loop 144 to still achieve the same functionality of the captured loop 144 when processed in a replay of the captured loop 144 in the instruction processing circuit 104. Also, other loop optimizations may be available to be made by the loop optimization circuit 618 based on the captured loop 144 that reduce the number of clock cycles required to process and execute a replay of the captured loop 144 in the instruction processing circuit 104, as compared to the number of clock cycles required to execute the replay of the original captured instructions 108D of the captured loop 144 with the same functionality. Also, other loop optimizations may be available to be made by the loop optimization circuit 618 based on the captured loop 144 that provides for critical instructions, such as timing critical instructions (e.g., load or instructions that are unlocking instructions to unlock dependence flow paths, to be indicated with scheduling hints to be scheduled for execution at a higher priority when replayed in the instruction processing circuit 104). In this manner, such critical instructions may be executed earlier, thus making their produced results ready earlier to be consumed by other consumer instructions in the captured loop 144 that are replayed. This can increase the throughput of replaying captured loops 144 in the instruction processing circuit 104.

Also, yet other loop optimizations may be available to be made by the loop optimization circuit 618 based on the captured loop 144 that can identify instructions that are load/store operations that can separated from the captured loop 144 as an instruction execution slice. An instruction execution slice in a captured loop is a set of instructions 108D in the captured loop 144 that compute load/store memory addresses needed for memory load/store instructions to be executed in replay of the captured loop 144. The loop optimization circuit 618 can be configured to convert an identified extracted instruction execution slice from a captured loop 144 into a software prefetch instruction(s) that can then be injected into a pre-fetch stage(s) in the instruction pipeline IP when the captured loop 144 is replayed to perform the loop optimization for the captured loop 144. The processing of the software prefetch instruction(s) for the instruction execution slice will cause the instruction processing circuit 104 to perform the extracted instructions 108D in the instruction execution slice earlier in the instruction pipeline IP as pre-fetch instructions 108. Thus, any resulting cache misses from the memory operations performed by processing the extracted execution slice instructions as pre-fetch instructions 108 can be recovered earlier for consumption by the dependent instructions in the captured loop 144 when the captured loop 144 is replayed.

With continued reference to FIG. 6, the loop capture circuit 606 is configured to provide the instructions 108D of the captured loop 144 to a loop replay circuit 614 to be replayed (i.e., processed again in another iteration of the loop) in an instruction pipeline IP of the instruction processing circuit 104. The loop replay circuit 614 determines if the captured loop 144 is to be replayed. In response to determining if the captured loop 144 is to be replayed, the loop replay circuit 614 can insert instructions 108D of the captured loop 144 or optimized loop 1440 in an instruction pipeline IP to be replayed. The loop replay circuit 614 is coupled to the instruction pipelines IP such that the loop replay circuit 614 can insert instructions 108D of the captured loop 144 in an instruction pipeline IP to be replayed. In this example, the loop replay circuit 614 is configured to inject or insert the instruction 108D for the captured loop 144 or optimized loop 1440 in the instruction pipeline IP after the decode circuit 118 in FIG. 1 since there is not a need to re-decode the fetched instructions 108F in the detected loop. In this example, the loop replay circuit 614 is configured to inject or insert the instruction 108D for the captured loop 144 or optimized loop 1440 in the instruction pipeline IP before the rename/allocate circuit 126 in FIG. 1 since the processor 100 in this example is an out-of-order processor. Thus, the decoded instructions 108D from the captured loop 144 or optimized loop 1440 to be replayed may be processed and/or executed out-of-order according to the issuance of the decoded instructions 108D by the scheduler circuit 143.

The loop replay circuit 614 is also coupled to the instruction fetch circuit 114 in this example. This is so that when the loop replay circuit 614 replays a loop, the loop replay circuit 614 can send a loop replay indicator 616 to the instruction fetch circuit 114. The instruction fetch circuit 114 can discontinue fetching of instructions 108D for the captured loop 144 while they are being replayed (inserted) into the instruction pipeline IP of the instruction processing circuit 104. the FIG. 7 is a block diagram of an exemplary processor-based system 700 that includes a processor 702 configured to speculatively predict a fetched predicted control instruction and reuse entries in a BIQ circuit used to store branch information for multiple instances of predicted control instructions speculatively predicted in a captured loop. The processor 702 can include, without limitation, the processor 100 in FIG. 1. The processor-based system 700 can include, without limitation, the processor-based system 102 in FIG. 1.

The processor-based system 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 700 includes the processor 702. The processor 702 represents one or more general-purpose processing circuits, such as a microprocessor, central processing unit, or the like. The processor 702 is configured to execute processing logic in computer instructions for performing the operations and steps discussed herein. In this example, the processor 702 includes a speculative prediction circuit 704 for making speculative predictions of fetched predicted control instructions. The speculative prediction circuit 704 could be the speculative prediction circuit 106 in FIG. 1. The speculative prediction circuit 704 can also be configured to reuse entries in a BIQ circuit used to store branch information for multiple instances of predicted control instructions speculatively predicted in a captured loop, including but not limited to the BIQ circuit 112 in FIG. 1.

The processor 702 also includes an instruction cache 706 for temporary, fast access memory storage of instructions and an instruction processing circuit 708. Fetched or prefetched instructions from a memory, such as from a system memory 710 over a system bus 712, are stored in the instruction cache 706. The instruction processing circuit 708 is configured to process instructions fetched into the instruction cache 706 and process the instructions for execution. The instruction processing circuit 708 is configured to insert the fetched instructions into one or more instruction pipelines that are then processed to execution.

The processor 702 and the system memory 710 are coupled to the system bus 712 and can intercouple peripheral devices included in the processor-based system 700. As is well known, the processor 702 communicates with these other devices by exchanging address, control, and data information over the system bus 712. For example, the processor 702 can communicate bus transaction requests to a memory controller 714 in the system memory 710 as an example of a slave device. Although not illustrated in FIG. 7, multiple system buses 712 could be provided, wherein each system bus constitutes a different fabric. In this example, the memory controller 714 is configured to provide memory access requests to a memory array 716 in the system memory 710. The memory array 716 is comprised of an array of storage bit cells for storing data. The system memory 710 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 712. As illustrated in FIG. 7, these devices can include the system memory 710, one or more input device(s) 718, one or more output device(s) 720, a modem 722, and one or more display controllers 724, as examples. The input device(s) 718 can include any type of input device, including but not limited to input keys, switches, voice processors, etc. The output device(s) 720 can include any type of output device, including but not limited to audio, video, other visual indicators, etc. The modem 722 can be any device configured to allow exchange of data to and from a network 726. The network 726 can be any type of network, including but not limited to a wired or wireless network, a private or public network, a local area network (LAN), a wireless local area network (WLAN), a wide area network (WAN), a BLUETOOTH™ network, and the Internet. The modem 722 can be configured to support any type of communications protocol desired. The processor 702 may also be configured to access the display controller(s) 724 over the system bus 712 to control information sent to one or more displays 728. The display(s) 728 can include any type of display, including but not limited to a cathode ray tube (CRT), a liquid crystal display (LCD), a plasma display, etc.

The processor-based system 700 in FIG. 7 may include a set of instructions 730 that may include predicted control instructions that are configured to be fetched and executed by the processor 702. The instructions 730 may be stored in the system memory 710, processor 702, and/or instruction cache 706 as examples of non-transitory computer-readable medium 732. The instructions 730 may also reside, completely or at least partially, within the system memory 710 and/or within the processor 702 during their execution. The instructions 730 may further be transmitted or received over the network 726 via the modem 722, such that the network 726 includes the non-transitory computer-readable medium 732. The instructions 730 may also include instructions that when executed by the processor 702, cause the processor 702 to speculatively predict a fetched predicted control instruction and reuse entries in a BIQ circuit used to store branch information for multiple instances of predicted control instructions speculatively predicted in a captured loop.

While the non-transitory computer-readable medium 732 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory (RAM), a magnetic disk storage medium, an optical storage medium, flash memory devices, etc.) and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories, registers, or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium, and executed by a processor or other processing device, or combinations of both. The components of the processors and systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A processor, comprising:
an instruction processing circuit; and
a branch information queue (BIQ) circuit comprising a plurality of branch entries each configured to store branch information associated with a predicted control instruction, and an instance indicator; and
the instruction processing circuit configured to:
fetch a plurality of instructions as an instruction stream into an instruction pipeline;
store first branch information associated with a first instance of a first predicted control instruction of the plurality of instructions in a first branch entry associated with the first predicted control instruction among the plurality of branch entries in the BIQ circuit;
speculatively predict the first instance of the first predicted control instruction based on the first branch information stored in the first branch entry;
detect a first iteration of a first loop comprising a second instance of the first predicted control instruction in the instruction stream; and
in response to detection of the first iteration of the first loop in the instruction stream, update a first instance indicator in the first branch entry indicating the second instance of the first predicted control instruction.

2. The processor of claim 1, wherein the instruction processing circuit is further configured to:
detect a second iteration of the first loop comprising a third instance of the predicted control instruction in the instruction stream; and
in response to detection of the second iteration of the first loop in the instruction stream, update the first instance indicator in the first branch entry indicating the third instance of the first predicted control instruction.

3. The processor of claim 1, wherein the instruction processing circuit is further configured to:
detect the first instance of the predicted control instruction; and
in response to detection of the first instance of the predicted control instruction, allocate the first branch entry in the BIQ circuit.

4. The processor of claim 1, wherein the instruction processing circuit is configured to update the first instance indicator in the first branch entry indicating the second instance of the first predicted control instruction, by being configured to increment the first instance indicator in the first branch entry.

5. The processor of claim 1, wherein the instruction processing circuit is further configured to:
execute the first instance of the first predicted control instruction to generate a resolution for the first instance of the first predicted control instruction; and
in response to execution of the first instance of the first predicted control instruction:
store the resolution of the first instance of the first predicted control instruction in the first branch information in the first branch entry in the BIQ circuit; and
update the first instance indicator in the first branch entry indicating the first instance of the first predicted control instruction has been resolved.

6. The processor of claim 5, wherein the instruction processing circuit is further configured to:
speculatively predict the second instance of the first predicted control instruction based on the first branch information stored in the first branch entry in the BIQ circuit; and
store the speculatively prediction of the second instance of the first predicted control instruction in the first branch information stored in the first branch entry.

7. The processor of claim 6, wherein the instruction processing circuit is further configured to:
execute the second instance of the first predicted control instruction to generate a resolution for the second instance of the first predicted control instruction; and
in response to execution of the second instance of the first predicted control instruction:
store the resolution of the second instance of the first predicted control instruction in the first branch information in the first branch entry in the BIQ circuit; and
update the first instance indicator in the first branch entry indicating the second instance of the first predicted control instruction has been resolved.

8. The processor of claim 7, wherein the instruction processing circuit is configured to update the first instance indicator in the first branch entry indicating the second instance of the first predicted control instruction has been resolved by being configured to decrement the first instance indicator in the first branch entry.

9. The processor of claim 7, wherein the instruction processing circuit is further configured to, in response to execution of the second instance of the first predicted control instruction:
determine if the resolution of the second instance of the first predicted control instruction in the first branch information in the first branch entry matches the speculative prediction of the second instance of the predicted control instruction in the first branch information in the first branch entry; and
in response to the resolution of the second instance of the first predicted control instruction not matching the speculative prediction of the second instance of the first predicted control instruction:
deallocate one or more second branch entries in the BIQ circuit associated with one or more second predicted control instructions of the plurality of instructions that are dependent on the second instance of the first predicted control instruction.

10. The processor of claim 9, wherein:
the instruction processing circuit is further configured to update a speculative history indicator based on the first branch information stored in the first branch entry;
the instruction processing circuit is configured to speculatively predict the second instance of the first predicted control instruction, by being configured to speculatively predict the second instance of the first predicted control instruction based on the speculatively history indicator; and the instruction processing circuit is further configured to, in response to the resolution of the second instance of the first predicted control instruction not matching the speculative prediction of the second instance of the first predicted control instruction:
stall fetching of one or more additional instructions of the plurality of instructions into the instruction pipeline until the speculative prediction history indicator is restored.

11. The processor of claim 7, wherein the instruction processing circuit is further configured to:
determine if all instances of the first predicted control instruction have been resolved based on the first instance indicator in the first branch entry; and
in response to determining all instances of the first predicted control instruction have been resolved, deallocate the first branch entry in the BIQ circuit.

12. The processor of claim 1, wherein:
the instruction processing circuit is further configured to:
store second branch information associated with a first instance of a second predicted control instruction of the plurality of instructions in a second branch entry among the plurality of branch entries in the BIQ circuit; and
speculatively predict the first instance of the second predicted control instruction based on the second branch information stored in the second branch entry associated with the second predicted control instruction in the BIQ circuit;
the instruction processing circuit is configured to:
detect the first iteration of the first loop further comprising a second instance of the second predicted control instruction in the instruction stream; and
the instruction processing circuit is further configured to, in response to detection of the first iteration of the first loop in the instruction stream:
update a second instance indicator in the second branch entry indicating the second instance of the second predicted control instruction.

13. The processor of claim 12, wherein the instruction processing circuit is further configured to:
execute the first instance of the second predicted control instruction to generate a resolution of the first instance of the second predicted control instruction; and
in response to execution of the first instance of the second predicted control instruction:
store the resolution of the first instance of the second predicted control instruction in the second branch information in the second branch entry in the BIQ circuit; and
update the second instance indicator in the second branch entry indicating the first instance of the second predicted control instruction has been resolved.

14. The processor of claim 13, wherein the instruction processing circuit is further configured to:
determine if all instances of the second predicted control instruction have been resolved based on the second instance indicator in the second branch entry; and
in response to determining all instances of the second predicted control instruction have been resolved:
deallocate the second branch entry in the BIQ circuit.

15. The processor of claim 1, wherein:
each branch entry of the one or more branch entries in the BIQ circuit is configured to store the branch information comprising a speculative prediction indicator associated with the predicted control instruction; and
the instruction processing circuit is configured to speculatively predict the first condition of the first instance of the first predicted control instruction based on a first speculative prediction indicator in the first branch entry associated with the first predicted control instruction in the BIQ circuit.

16. The processor of claim 1, wherein the instruction processing circuit is further configured to:
in response to detection of the first loop in the instruction stream:
capture a plurality of first loop instructions of the plurality of instructions in the detected first loop as a first captured loop, wherein the plurality of first loop instructions comprising the first predicted control instruction;
determine if the first captured loop is to be replayed in the instruction pipeline; and
in response to determining the first captured loop is to be replayed in the instruction pipeline, insert the first captured loop in the instruction pipeline to be replayed.

17. The processor of claim 16, wherein the instruction processing circuit further comprises:
a loop detection circuit configured to detect the first loop in the instruction stream;
a loop capture circuit configured to capture the plurality of loop instructions in the detected first loop as the first captured loop; and
a loop replay circuit configured to:
determine if the first captured loop is to be replayed in the instruction pipeline; and
in response to determining the first captured loop is to be replayed in the instruction pipeline, insert the first captured loop in the instruction pipeline to be replayed.

18. The processor of claim 16, wherein the instruction processing circuit further comprises a loop buffer memory comprising a plurality of instruction entries each configured to store an instruction among the plurality of instructions;
wherein the loop buffer circuit is configured to:
capture the plurality of loop instructions of the detected first loop as the first captured loop by being configured to:
store each loop instruction among the plurality of loop instructions in an instruction entry among the plurality of instructions entries in the loop buffer memory; and
wherein the instruction processing circuit is configured to:
in response to determining the first captured loop is to be replayed in the instruction pipeline, insert the first captured loop from the loop buffer memory in the instruction pipeline to be replayed.

19. The processor of claim 1, wherein the instruction processing circuit further comprises:
an instruction fetch circuit configured to fetch the plurality of instructions into the instruction pipeline as the instruction stream to be executed; and
an execution circuit configured to execute the plurality of instructions in the instruction stream.

20. A method of reusing branch information for multiple instances of predicted control instructions in a captured loops in a processor, comprising:
fetching a plurality of instructions as an instruction stream into an instruction pipeline;

storing first branch information associated with a first instance of a first predicted control instruction of the plurality of instructions in a first branch entry of a plurality of branch entries in a branch information queue (BIQ) circuit, the first branch entry associated with the first predicted control instruction;

speculatively predicting the first instance of the first predicted control instruction based on the first branch information stored in the first branch entry;

detecting a first iteration of a first loop comprising a second instance of the first predicted control instruction in the instruction stream; and updating a first instance indicator in the first branch entry indicating the second instance of the first predicted control instruction, in response to detection of the first iteration of the first loop in the instruction stream.

21. A non-transitory computer-readable medium having stored thereon computer executable instructions which, when executed by a processor, cause the processor to:

fetch a plurality of instructions as an instruction stream into an instruction pipeline;

store first branch information associated with a first instance of a first predicted control instruction of the plurality of instructions in a first branch entry of a plurality of branch entries in a branch information queue (BIQ) circuit, the first branch entry associated with the first predicted control instruction;

speculatively predict the first instance of the first predicted control instruction based on the first branch information stored in the first branch entry;

detect a first iteration of a first loop comprising a second instance of the first predicted control instruction in the instruction stream; and update a first instance indicator in the first branch entry indicating the second instance of the first predicted control instruction, in response to detection of the first iteration of the first loop in the instruction stream.

* * * * *